(12) United States Patent
Melvin et al.

(10) Patent No.: US 9,050,720 B2
(45) Date of Patent: Jun. 9, 2015

(54) HITCH-COUPLING TOOL

(71) Applicants: Robert Melvin, Portland, OR (US); Leland Stanford Davis, III, Portland, OR (US)

(72) Inventors: Robert Melvin, Portland, OR (US); Leland Stanford Davis, III, Portland, OR (US)

( * ) Notice: Subject to any disclaimer, the term of this patent is extended or adjusted under 35 U.S.C. 154(b) by 0 days.

(21) Appl. No.: 14/049,036

(22) Filed: Oct. 8, 2013

(65) Prior Publication Data

US 2014/0145457 A1    May 29, 2014

Related U.S. Application Data

(60) Provisional application No. 61/730,339, filed on Nov. 27, 2012.

(51) Int. Cl.
*B25J 1/00*       (2006.01)
*B60D 1/58*       (2006.01)

(52) U.S. Cl.
CPC .... *B25J 1/00* (2013.01); *B60D 1/58* (2013.01)

(58) Field of Classification Search
USPC .............. 294/15, 902, 16, 26, 92, 103.1; D12/162; 280/504–508, 510–514, 901
See application file for complete search history.

(56) References Cited

U.S. PATENT DOCUMENTS

| | | | | |
|---|---|---|---|---|
| 1,868,891 A | * | 7/1932 | Faudi | 403/122 |
| 2,166,208 A | * | 7/1939 | Dayton | 280/513 |
| 3,184,259 A | * | 5/1965 | Almdale | 294/902 |
| 4,241,936 A | * | 12/1980 | Carruthers et al. | 280/507 |
| 4,522,088 A | * | 6/1985 | Berglund | 294/15 |
| 4,527,925 A | * | 7/1985 | Bauer et al. | 280/513 |
| 5,979,840 A | * | 11/1999 | Hollister et al. | 294/15 |
| 6,467,793 B2 | * | 10/2002 | Putnam | 280/508 |
| D633,417 S | * | 3/2011 | Najarro | D12/162 |
| 8,235,411 B2 | * | 8/2012 | Works et al. | 280/507 |
| 2004/0051326 A1 | * | 3/2004 | Belik | 294/902 |

* cited by examiner

*Primary Examiner* — Paul T Chin
(74) *Attorney, Agent, or Firm* — Mark S Hubert

(57) ABSTRACT

A compact, lightweight hitch-coupling tool is designed to lift, move, and align a hitch-head assembly via two or more points/regions of contact with a hitch ball. When a user moves a hitch-head assembly via the hitch-coupling tool of the present invention, the assembly's mass is evenly distributed through the center of the head of the tool allowing a user to easily maneuver large hitch-head assemblies with one hand.

11 Claims, 7 Drawing Sheets

HITCH-COUPLING TOOL

CLAIM OF DOMESTIC PRIORITY

This application claims of the benefit under 35 U.S.C. 120 of U.S. provisional application 61/730,339 filed Nov. 27, 2012.

BACKGROUND OF THE INVENTION

Everyone loves to take a road trip. From escaping for a few days to a refreshing winter or summer vacation, it is not surprising that the RV market has been growing. Escaping cold winters, snowbirds have been known to spend months living out of RVs; however, in recent years there has been an influx of young families purchasing RVs, emphasizing spending time together, but doing so while on a budget, and RVing has always offered that.

Anyone who has ever had to couple a trailer hitch to the receiver of their towing vehicle knows that it can be a cumbersome, dirty, and often a frustrating task. In the case of large loads, such as RVs, boats equestrian trailers, which can be hard to maneuver in a safe and controlled manner, a weight distribution hitch is required to improve the towing vehicle's ability to brake, steer, and turn, preventing dangerous out-of-control driving situations. Unfortunately, the combination of an adjustable weight distribution shank and adjustable ball mount, results in a heavy hitch-head assembly, with an awkward center of mass, which is difficult to pick up, move, and insert into the receiver on a towing vehicle. Add in a lubricated ball mount, and now not only is the hitch-head assembly awkward and heavy, it is also slippery.

SUMMARY OF THE INVENTION

At the heart of the present invention is a hitch-coupling tool that allows the user to easily pick up a hitch-head assembly and efficiently maneuver that assembly in and out of the vehicle receiver or from the receiver to a remote location for storage. The hitch-coupling tool will accommodate any hitch ball size, making it universal. When the hitch-coupling tool is attached to the hitch ball, the center of mass of the hitch-head assembly/tool is shifted through the center of the head of the hitch-coupling tool, making the hitch-head assembly easier to carry and maneuver. Should the towing vehicle have limited space around the receiver, the hitch-coupling tool is pivotable about the hitch ball, allowing the user to move the tool handle out of the way of the towing vehicle's bumper. The hitch-coupling tool of the present invention is lightweight and easy to use, allowing a broader range of individuals to move and install the hitch-head assembly of a weight distribution hitch. The hitch-coupling tool of the present invention firmly grips the hitch ball of the hitch-head assembly, preventing rotation of the hitch-head.

DETAILED DESCRIPTION

Figure 1:
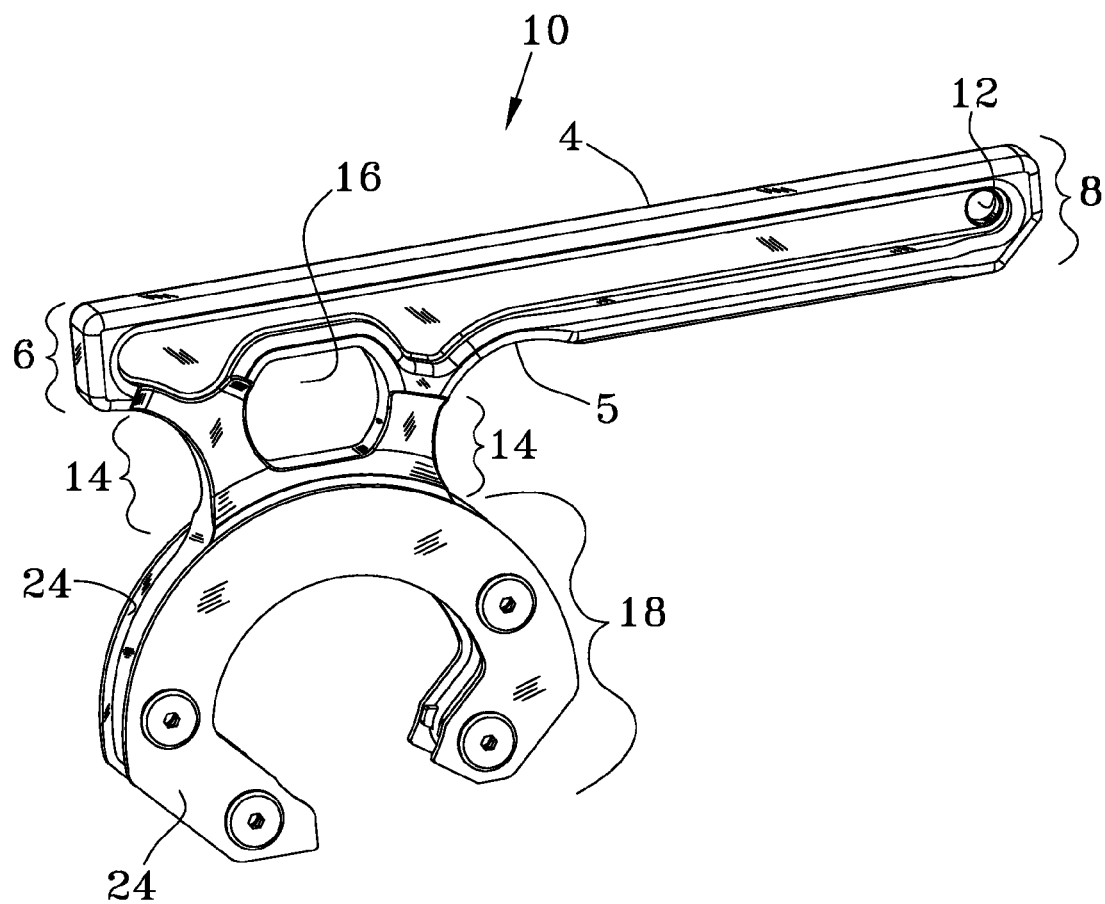
FIG. 1 is a perspective view of the hitch-coupling tool of the present invention.
Figure 11:
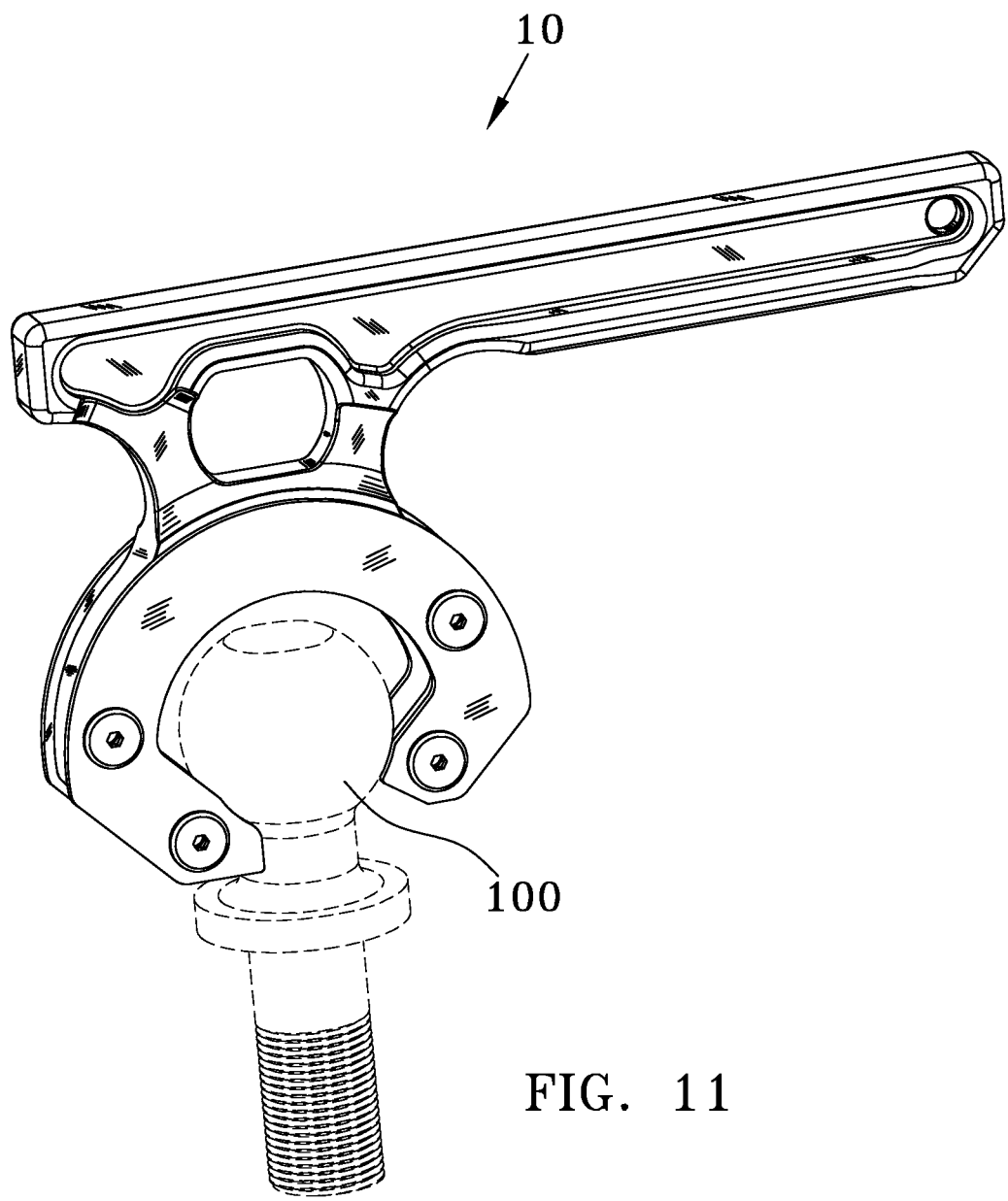
FIG. 11 is a perspective view of the hitch-coupling tool of the present invention engaged with a hitch ball.

Looking at FIGS. 1 & 11 the hitch-coupling tool 10 of the present invention is illustrated. Hitch-coupling tool 10 comprises a handle 4 with a blunt first end 6, and tapered second end 8 and ergonomic finger groove 5. Blunt end 6 is designed to simply be as unobtrusive as possible to avoid interfering with the bumper of the towing vehicle. A mounting orifice 12 resides therethrough tapered second end 8 of handle 4. Neck 14 connects handle 4 to head (claw) 18. As illustrated head 18 is asymmetrical in design with a partial circular configuration. Gripping orifice 16 extends therethough neck 14 and both reduces the total weight of hitch-coupling tool 10 and provides an additional grip, as a user's fingers can be inserted through gripping orifice 16 should the user desire or need to use both hands when using tool 10 to move or manipulate a heavy hitch-head assembly.

As illustrated, handle 4, neck 14, and head 18 form a unitary body for both durability and ease of manufacture. However, handle 4, neck 14, and head 18 could be constructed independently of one another and mechanically fastened together without departing from the scope of the invention. Handle 4, neck 14, and a head 18 can be comprised of any durable lightweight material, such as, but not limited to: glass-filled nylon, aluminum, steel, stainless steel, or any durable polymer.

Figure 2:
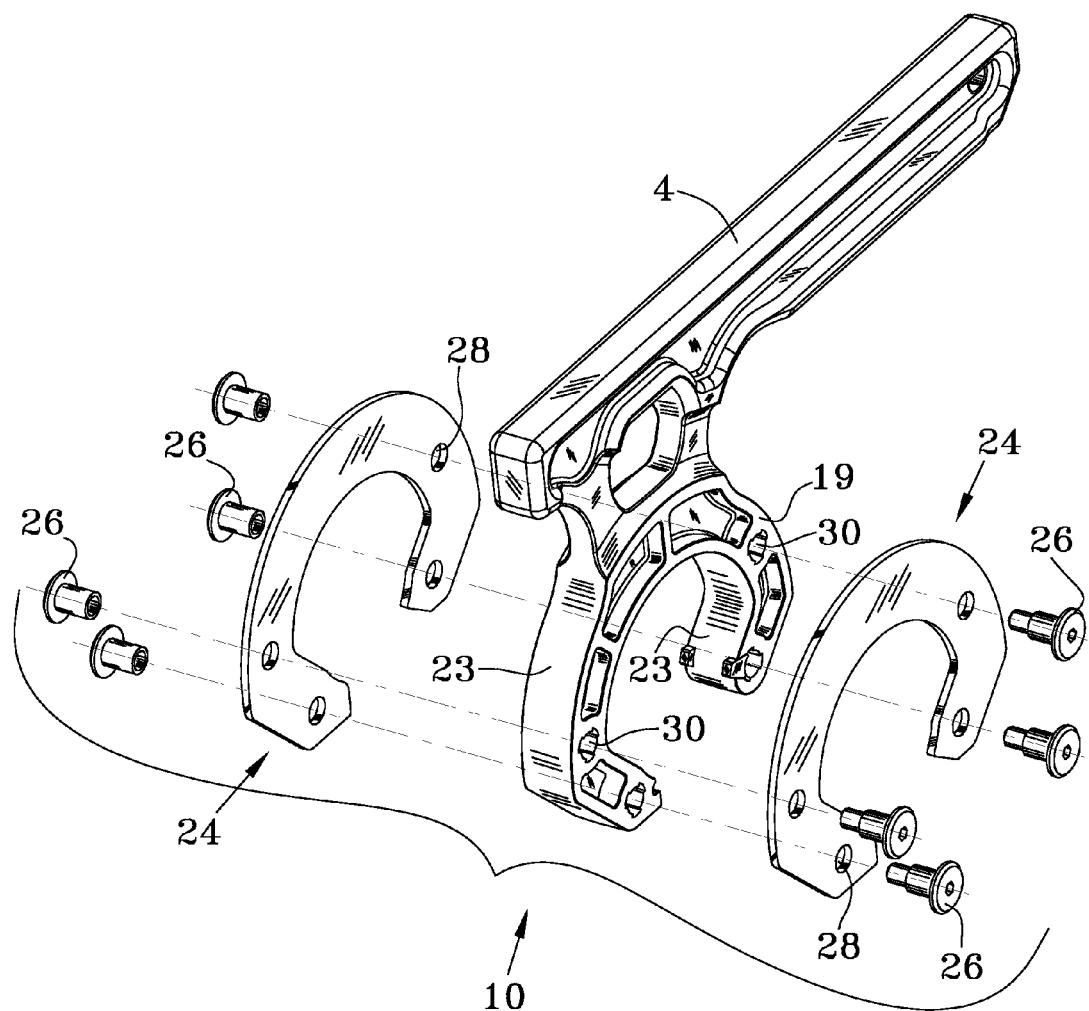
FIG. 2 is an exploded perspective view of the hitch-coupling tool of the present invention.
Figure 3:
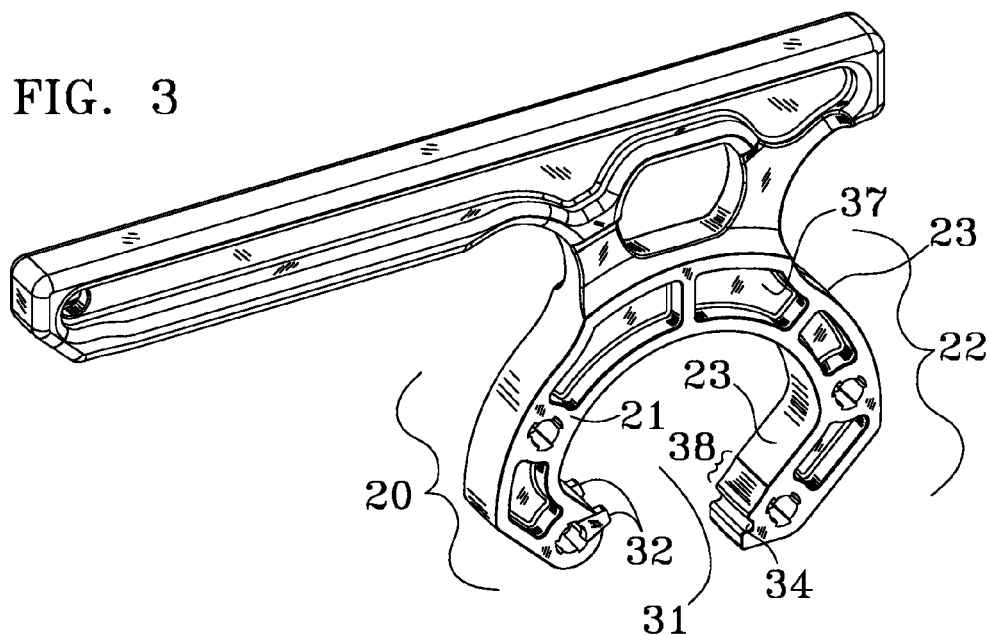
FIG. 3 is a perspective view of hitch-coupling tool of the present invention with the interchangeable coupling plates removed.
Figure 4:
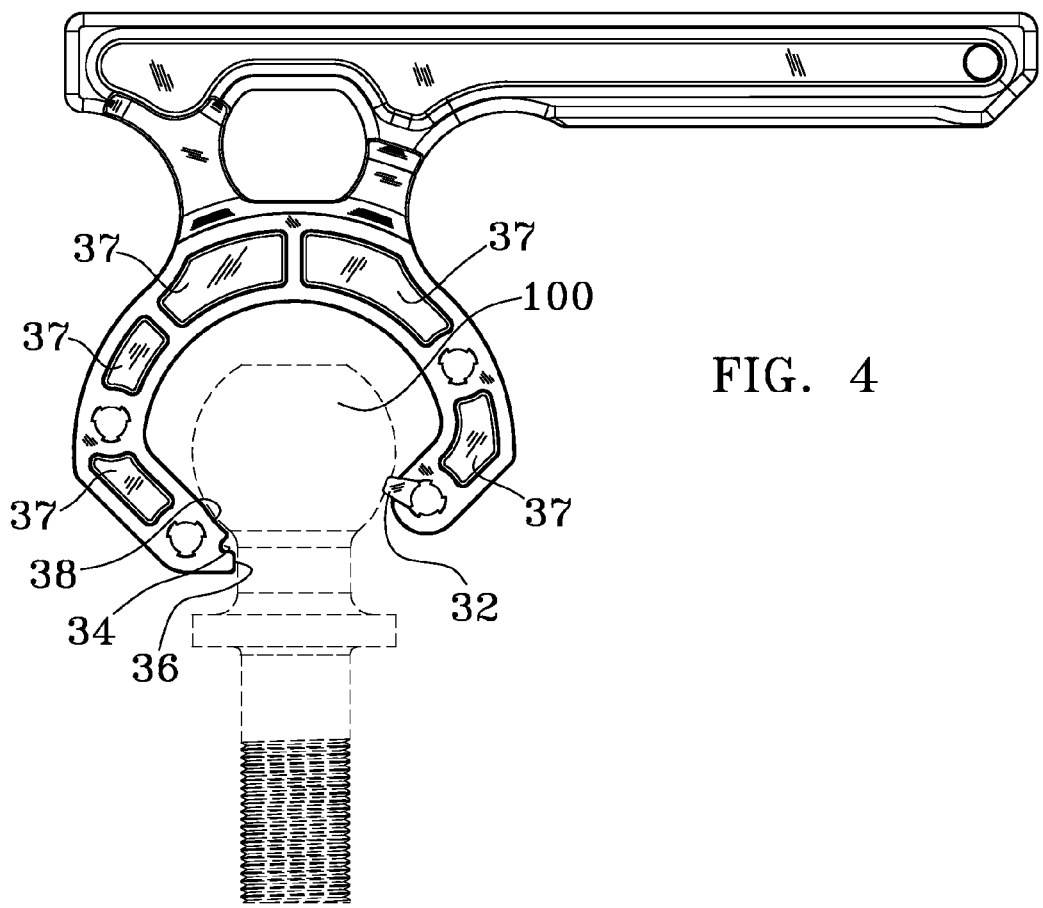
FIG. 4 is a left-side view of the hitch-coupling tool of the present invention engaged with a hitch ball, wherein the interchangeable coupling plates have been removed.
Figure 6:
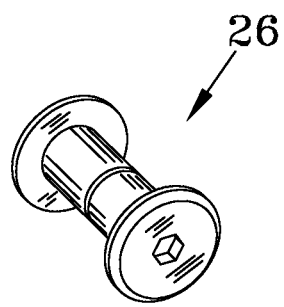
FIG. 6 is a perspective view of a nut/bolt assembly of the present invention.
Figure 7:
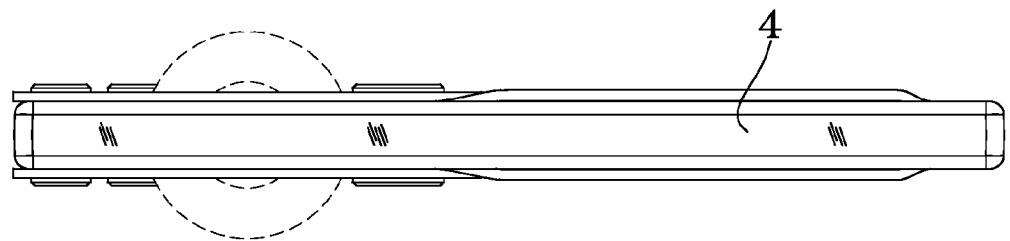
FIG. 7 is a top view of the hitch-coupling tool of the present invention engaged with a hitch ball.
Figure 8:
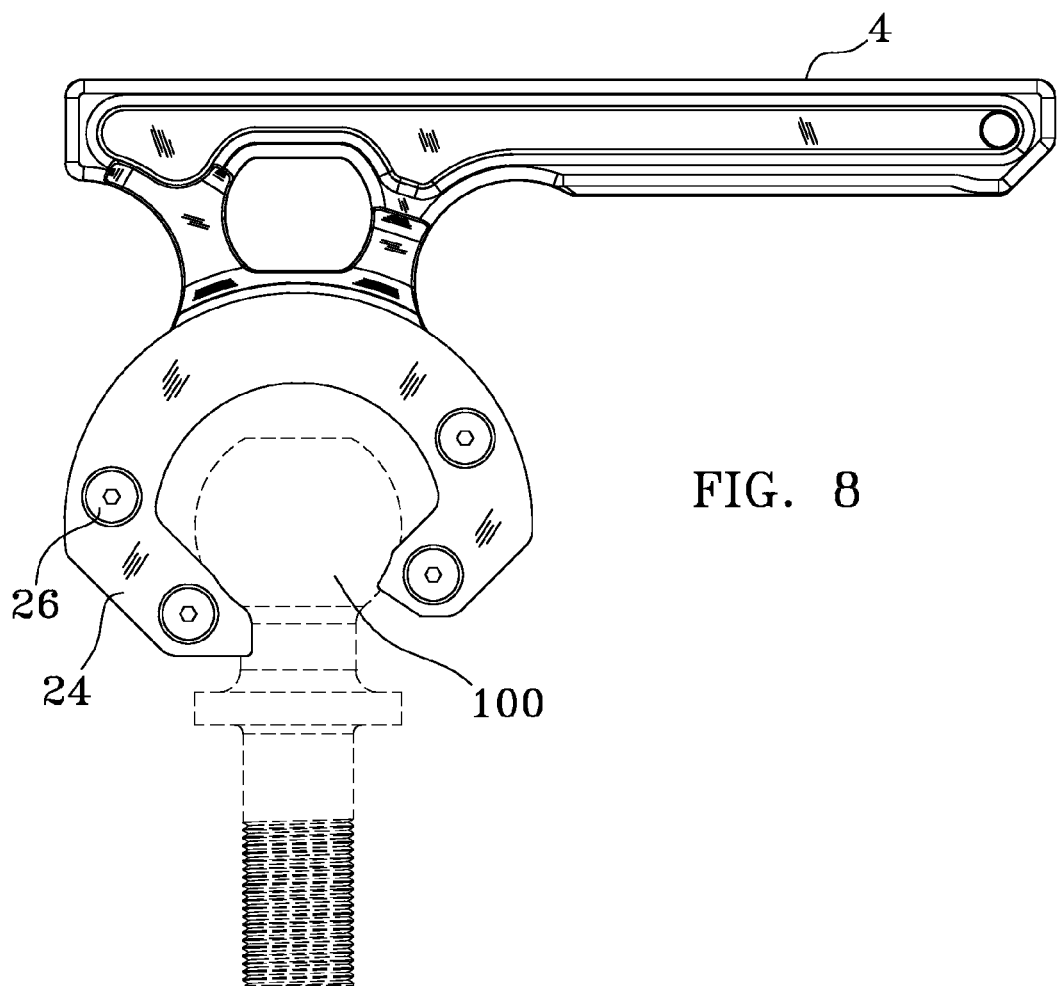
FIG. 8 is a left-side view of the hitch-coupling tool of the present invention engaged with a hitch ball.
Figure 9:
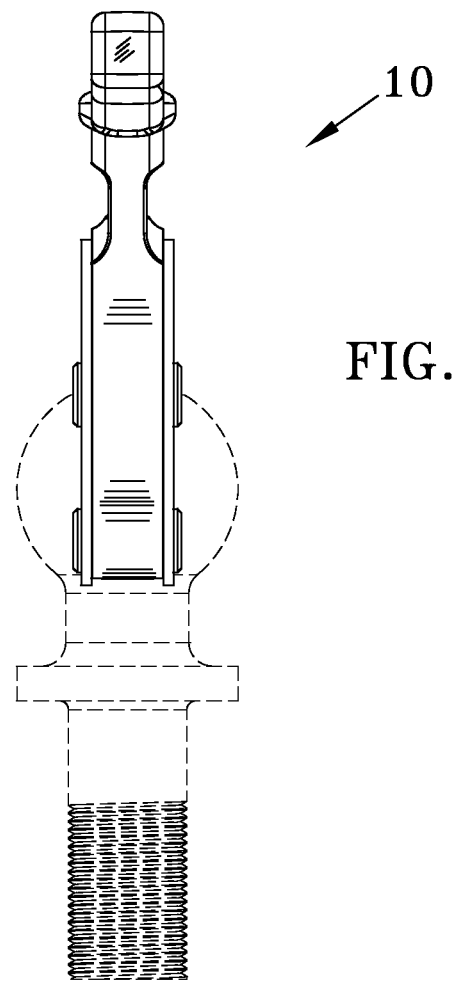
FIG. 9 is a front view of the hitch-coupling tool of the present invention engaged with a hitch ball.
Figure 10:
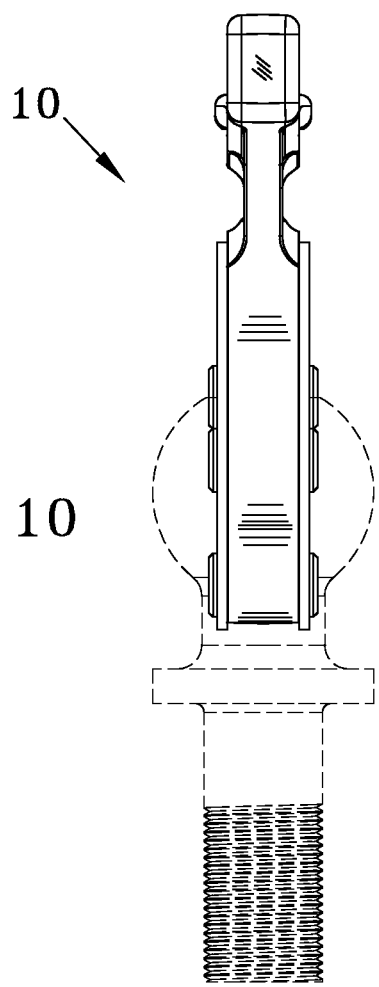
FIG. 10 is a rear view of the hitch-coupling tool of the present invention engaged with a hitch ball.

Looking at FIGS. 2-4 it can seen be that head 18 has a first face 19, a second face 21 (FIG. 3), and a shoulder 23 connecting first face 19 and second face 21 (See FIG. 3). Numerous recessed channels 37 on first face 19 and second face 21 add both a unique design element while also reducing the weight of tool 10 (FIG. 4). In at FIG. 2-3 it can be seen that head 18 comprises short-coupling arm 20 and long-coupling arm 22, and interchangeable coupling plates 24. As illustrated in FIG. 2 coupling plates 24 are connected to first face 19 and second face 21 of head 18 via four nut/bolt assemblies 26, (FIG. 6) which pass through plate orifices 28 and connect within head orifices 30 as is well known in the art.

Still looking at FIGS. 2-4 short-coupling arm 20 and long-coupling arm 22 form an open-ended, hitch ball grabbing cavity 31. The unique geometry of both short-coupling arm 20 and long-coupling arm 22 are designed to work in unison to provide the most stability when tool 10 is in the loaded position (i.e. connected to a hitch ball). Two gripping prongs 32 extend from short-coupling arm 20 and by virtue of their spacing (the spacing between individual prongs), it is the inside corner of each gripping prong 32 that contacts hitch ball 100. Because of the weight of the hitch ball 100 and attached hitch-head assembly (not illustrated), gripping prongs 32 slightly indent hitch ball 100 "biting" into hitch ball 100, to aid in securing hitch ball 100 within the hitch ball grabbing cavity 31 (and the hitch-head to which hitch ball 100 is attached). The "bite" by gripping prongs 32 keep tool 10 from rotating under load, and provide the only contact surface for hitch ball 100 on short-coupling arm 20. Gripping prongs 32, can be made of any durable material, including but not limited to tungsten carbide, steel, stainless steel, or a durable polymer, but it is to be noted that in the preferred embodiment the gripping prongs 32 are made of a material that is harder than the metal of the hitch ball 100.

The gripping prongs 32 are replaceable wedge shaped bits or inserts that are retained by their wedge geometry in a matingly configured recess formed in the short-coupling arm 20 (not illustrated). The gripping prongs 32 are further constrained within the recess by coupling plates 24.

Looking at FIG. 3 it can be seen that shoulder 23 of long-coupling arm 22 comprised a shallow ball-channel 38 in which hitch ball 100 rests, as is illustrated in FIG. 4. Long-coupling arm 22 also comprises a neck channel 34 proximate ball-channel 38, and a neck-abutment portion 36 proximate neck channel 34.

Looking at FIGS. 1 & 11 it can be seen that the surface area of coupling plates 24 is larger than the surface area of first face 19 and second face 21, such that when coupling plates 24 are connected to short-coupling arm 20 and long-coupling arms 22, coupling plates 24 extend beyond the edge of faces 19, 21. While the coupling plates 24 are not required for tool 10 to engage hitch ball 100 and allow a user to carry a load-leveling hitch-head with ease, coupling plates 24 are designed to increase the rigidity of tool 10 should the tool be made of a lightweight material such as glass filled nylon. Due to the separation between the inner faces of plates 24 and the spherical geometry of the hitch ball 100, plates 24 contact the hitch ball in conjunction with the gripping prongs 32 to garner a 4-point "grip" on the hitch ball's lower hemisphere. In models of the hitch-coupling tool 10 of the present invention that do not employ coupling plates 24, or wherein the coupling plates reside flush with the edge of head 18 (first face 19, and second face 21), there would be a 3 point "grip" on the hitch ball. As used herein "point" could also include a "region" of contact and is not restricted to one physical point.

Figure 5:
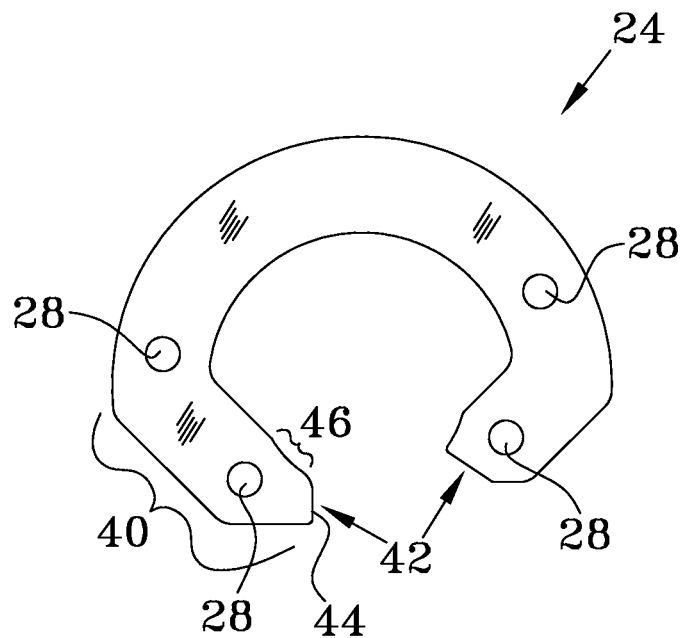
FIG. 5 is a front view of an interchangeable coupling plate of the present invention

A accommodate all standard sized hitch balls, a user can simply use larger or smaller coupling plates to accommodate different sized hitch balls. Using correspondingly sized coupling plate 24, tool 10 can accommodate three sizes of hitch balls 1⅞", 2", and 2 and 5/16". Turning to FIG. 5 it can be seen that section 40 of plate 24 corresponds geometrically to the lower section of long-coupling arm 22. Section 40 can simply be lengthened (resulting in a smaller opening 42) to accommodate a smaller hitch ball 100. For ease of manufacture, the placement of plate orifices 28 are not altered in making different sized plates 24 to accommodate different sized hitch balls. The portion of plate material between orifice 28 and blunt end 44 of section 40 is manufactured to be longer or shorter depending on the hitch ball sizing. When coupling plates 24 are connected to first face 19 and second face 21 of head 18, hitch ball 100 will contact gripping projections 32 on short-coupling arm 20 and will rest in plate notches 46 in coupling plates 24. Coupling plates 24 can be made of any durable material including but not limited to steel or stainless steel.

In operation the hitch-coupling tool 10 is simply slid over the hitch ball 100 and positioned at an approximate 90 degree angle with the hitch ball 100 as is illustrated in FIG. 11. The user is now ready to lift the hitch-head assembly.

We claim:

1. A hitch-coupling tool comprising;
   a handle;
   a neck;
   a head with a first face, a second face, and a shoulder connecting said first face to said second face;
   wherein said head further comprises a short-coupling arm and a long-coupling arm;
   wherein said sort-coupling arm and said long-coupling arm are in spaced configuration defining an open cavity for receiving a hitch ball;
   wherein said short-coupling arm further comprises at first head orifice formed therethrough;
   wherein said long-coupling arm further comprises a second head orifice formed therethrough; and
   two coupling plates with at least one plate orifice extending therethrough;
   wherein said hand, said neck, and said head form a unitary body, and wherein said coupling plates are connected to said first face and said second face via two nut/bolt assemblies passing through said plate orifice and said first head orifice and said second head orifice.

2. The hitch-coupling tool of claim 1 wherein said coupling plates are larger in surface area than said first face and said second face such that when said coupling plates are connected to said short-coupling arm and said long-coupling arm, said coupling plates extend beyond the edge of said first face and said second face.

3. The hitch-coupling tool of claim 2 wherein said coupling plates further contain plates notches for the resting engagement of said hitch ball.

4. The hitch-coupling tool of claim 3 wherein said short coupling arm further comprises two gripping prongs for biting engagement with said hitch ball.

5. The hitch-coupling tool of claim 4 wherein said gripping prongs are wedge shaped.

6. The hitch-coupling tool of claim 5 wherein said handle further comprises a first blunt end and a second tapered end.

7. The hitch-coupling tool of claim 6 wherein said handle further comprises an ergonomic finger grove.

8. The hitch-coupling tool of claim 7 wherein said handle further comprises a mounting orifice.

9. A lifting and alignment device for a hitch coupling, comprising:
   a handle;
   a claw; and
   a neck connecting said handle to said claw;
   wherein said claw has a partially circular configuration having a first end and a second end, said first end having at least one hardened steel bit extending therefrom toward said second end and further comprising:
   a first claw side plate;
   a second claw side plate; and
   at least one claw side plate fastener;
   wherein said claw has two parallel side faces, and said first claw side plate and said second claw side plate are each affixed to a parallel side face of said claw with said at least one claw side plate fastener so that said claw side plates lie in a spaced parallel configuration, and further comprising a second hardened steel bit, wherein said second steel bit extends therefrom said first end toward said second end, said second steel bit held in a spaced configuration from said hardened steel bit and still further comprising a ball-channel formed at said second end, said ball-channel adapted to cradle an arced section of a hitch ball.

10. The lifting and alignment device of claim 9 wherein said ball-channel is formed between said first claw side plate, said second end and said second claw side plate.

11. The lifting and alignment device of claim 10 wherein said hardened steel bit and said second hardened steel bit are replaceable and extend from said first end beyond said claw side plates.

* * * * *